Jan. 19, 1965   R. D. BOUTROS   3,166,330
SEALING MEANS FOR RECEPTACLE SHAFT OPENING
Original Filed Oct. 27, 1959   6 Sheets-Sheet 1

INVENTOR.
RICHARD D. BOUTROS
BY
Cumpston & Shaw
his attorneys.

Jan. 19, 1965   R. D. BOUTROS   3,166,330
SEALING MEANS FOR RECEPTACLE SHAFT OPENING
Original Filed Oct. 27, 1959   6 Sheets-Sheet 6

INVENTOR.
RICHARD D. BOUTROS
BY
Cumpston + Shaw
his attorneys.

United States Patent Office 3,166,330
Patented Jan. 19, 1965

3,166,330
SEALING MEANS FOR RECEPTACLE
SHAFT OPENING
Richard D. Boutros, Fairport, N.Y., assignor to Mixing Equipment Co., Inc., Rochester, N.Y., a corporation of New York
Continuation of application Ser. No. 848,995, Oct. 27, 1959. This application July 12, 1962, Ser. No. 212,181
14 Claims. (Cl. 277—8)

This invention relates to devices for sealing an opening for a shaft through the wall of a fluid-containing receptacle, such as the opening for a rotatable shaft, as for example, the drive shaft of an agitating or mixing device, one object of the present invention being to provide a sealing device of the above character having a more practical and efficient construction and mode of operation.

In the past, it has been common practice in sealing a shaft opening through the wall of a fluid-containing receptacle to use either a stuffing box having a series of packing rings therein and a gland for compressing said rings around the shaft, or to use a mechanical seal comprising a stationary ring fixed to a wall of the receptacle and having a highly finished surface and a second ring mounted on the shaft for rotation therewith and having a highly finished surface which was held in close-fitting, substantially fluid-tight engagement with the finished surface of the first ring.

However, neither of these sealing devices has been entirely satisfactory, for it is extremely difficult to get a perfect seal with the stuffing-box type of construction, because a certain amount of fluid will seep through the packing along the shaft. This not only presents a maintenance expense and problem, but if the fluid within the receptacle is inflammable, toxic, corrosive, or valuable, the loss through the stuffing box may be critical.

On the other hand, the mechanical seal is capable of providing a substantially fluid-tight seal, but it has a disadvantage in that the seal is consumable and is subject to fracture. When the shaft opening is below the fluid level and the mechanical seal fails, there is nothing to prevent rapid loss of the contents of the receptacle through the shaft opening and the only way to reduce the loss of the tank contents is to pump the tank out as quickly as possible. In the case, for example, of gasoline storage tanks holding from one to five million gallons of gasoline, the pumping out of the tank requires a considerable length of time and much gasoline will be lost during the pumping-out operation. In many cases there may be no other place to pump 5,000,000 gallons of gasoline since no tanks are available. In addition, if the shaft referred to is part of a mixing or agitating apparatus, there is a further disadvantage in that when the mechanical seal fails, the mixing apparatus must be shut off and its use discontinued until the seal can be replaced. A further disadvantage is that as a mechanical seal cannot be made in two or more segments and assembled laterally over a shaft, but must be threaded over the end of the shaft, the above repairs to the mechanical seal cannot be made until the shaft can be laboriously removed from the receptacle. As pointed out above, by this time, excessive loss of the contents may have already taken place. If the contents of the receptacle are for any reason explosive, toxic, or valuable, the failure of the mechanical seal not only can be dangerous to the health and safety of the workmen, but also can seriously damage expensive equipment and facilities and greatly increase the cost of processing or storing the particular contents.

Another object is, therefore, to provide an improved shaft sealing construction having the fluid-tight sealing action of a mechanical seal, but which is so constructed that if for any reason the mechanical seal should fail, the damaged seal may be readily replaced with an operable mechanical seal, without, however, necessitating the disassembly of the mixing apparatus, the removal of the shaft and agitator from thereceptacle, the use of special tools, or the need of highly skilled workmen.

Another object is to provide a shaft sealing construction having the above advantages, which is provided with improved auxiliary sealing means, in addition to the mechanical seal, so that upon failure of the mechanical seal, the opening through the wall of the receptacle around the shaft can be quickly and easily resealed by the auxiliary sealing means, thereby preventing loss of content and facilitating the replacement of the mechanical seal.

Another object is to provide a shaft sealing construction of the above nature in which the auxiliary sealing means also provides a substantially fluid-tight seal so that my shaft sealing construction may be safely used with pressure receptacles, or in positions below the level of the contents within the receptacle.

Another object is to provide a shaft sealing construction having the above advantages in which means are provided for securely holding the auxiliary sealing means in sealing engagement while the damaged mechanical seal is removed and subsequently repaired or replaced.

Another object is to provide a shaft sealing construction of the above character in which, after the mechanical seal has been replaced, the auxiliary sealing means may be disengaged to bring the new mechanical seal into sealing position, so that the operative rotation of the shaft may be resumed to continue and complete the mixing operation.

Another object is to provide a shaft sealing construction of the above character in which the auxiliary sealing means may be brought into sealing engagement, the damaged mechanical seal replaced with an operable mechanical seal and the replacement mechanical seal moved into sealing position with a minimum of time and effort, and without necessitating the removal of the agitator shaft from the receptacle or the disassembly of the agitating apparatus.

This application is a continuation of my prior copending application Serial No. 848,995, filed October 27, 1959, and now abandoned, Sealing Means for Receptacle Shaft Opening, which disclosed and claimed a modification and improvement over the constructions disclosed and claimed in my prior joint patent application with Milton Dykman, Serial No. 607,195, Sealing Means for Receptacle Shaft Opening, now Patent No. 2,911,240. In the constructions disclosed and claimed in Patent No. 2,911,240, means were provided whereby the mechanical seal could be replaced without the removal of the agitator shaft and without disassembly of the agitating apparatus. However, in the above constructions, means were provided whereby the power shaft from the agitating apparatus to the agitator shaft could be moved axially to allow the mechanical seal to be replaced. These constructions necessitated a sliding connection between the drive assembly and the power shaft and requires a certain amount of headroom above the upper end of the agitator assembly to accommodate this axial movement of the power shaft. My present invention provides a construction having the same advantages as the constructions shown in the above patent, but it does not require that there be movement between the power output shaft and the gear reducing means, nor does it require additional headroom to accommodate the movement of the power shaft.

A further object of the present invention is, therefore, to provide a shaft sealing construction having the above advantages in which the mechanical seal may be removed as a complete assembly or unit and then repaired or replaced while the shaft is held in situ; that is, without necessitating any axial movement of the power shaft.

Still a further object is to provide a shaft sealing construction of the above character which requires fewer parts than heretofore and which may be readily manufactured and assembled at a lower cost than the construction shown in the above patent.

To these and other ends the invention resides in certain improvements and combinations of parts, all as will be hereinafter more fully described, the novel features being pointed out in the claims at the end of the specification.

Figure 1:
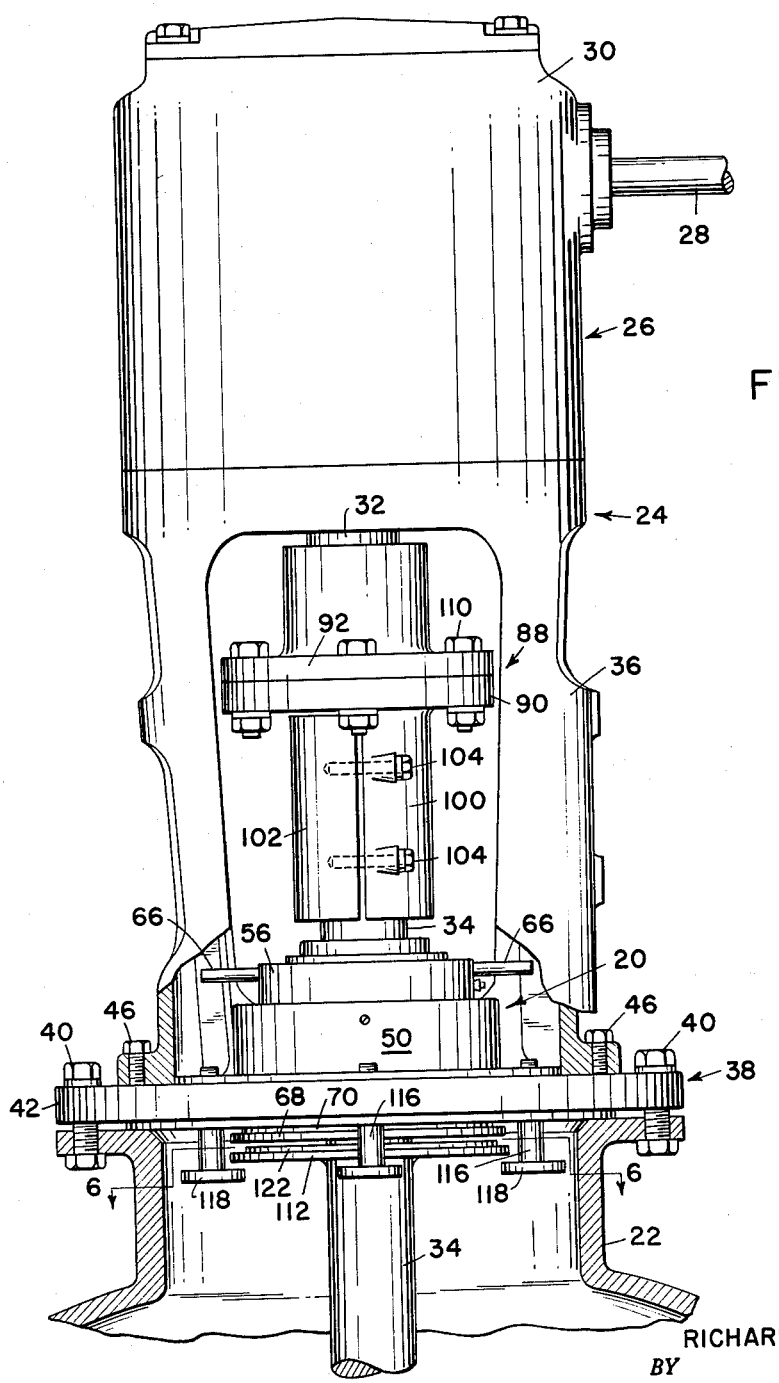
FIG. 1 is a fragmentary side elevation, partly broken away and partly in section of a mixing device and shaft sealing construction embodying the present invention and shown as applied to the top of a mixing receptacle.

The preferred embodiment of the present invention, herein disclosed by way of illustration, comprises a device for sealing the opening around a rotatable shaft, as for example, the impeller or agitator shaft of a mixing device. Specifically, my invention provides means whereby a mechanical seal may be safely used with mixing apparatuses without fear of appreciable loss of contents upon failure of the seal. In addition, when the mixer is of the side or bottom entering type, or is used in any position with vessels under pressure, my invention also provides auxiliary sealing means inboard of the primary or mechanical seal whereby the opening in the receptacle may be quickly secured upon the failure of the mechanical seal. Although these auxiliary sealing members are not designed to accommodate the shaft when rotating, they are effective when the shaft is stationary and serve their necessary purpose in that they provide an effective seal during the time when the shaft element is stationary and the damaged mechanical seal is being repaired or replaced. The details of my invention will be presently described.

I have shown my seal construction generally at 20 (FIG. 1) as mounted on the flanged nozzle 22 of a fluid containing receptacle or tank (not shown). Seal 20 in turn has mounted thereon a mixing apparatus shown generally at 24 which comprises a standard or conventional gear reduction unit shown generally at 26 through which rotary power is transmitted from a prime mover, such as an electric motor or the like. The electric motor (not shown) is coupled to an input shaft 28 which leads into housing 30 and is connected with the gearing therein. Reduction unit 26 is provided with an output shaft 32 which extends for a short distance below housing 30 and which serves as the driving means for an agitator or impeller shaft 34, as hereafter described. Reduction unit 26 is mounted upon an elongated open frame member 36 by means of suitable bolts (not shown). Frame 36 is attached at the opposite end thereof to a closure member or flange shown generally at 38 which comprises part of seal 20 and which in turn is secured to nozzle 22 by means of suitable bolts 40. Reduction unit 26 is of well known construction, and accordingly, no further illustration or description of the same is believed necessary in order to fully understand the present invention.

Figure 2:
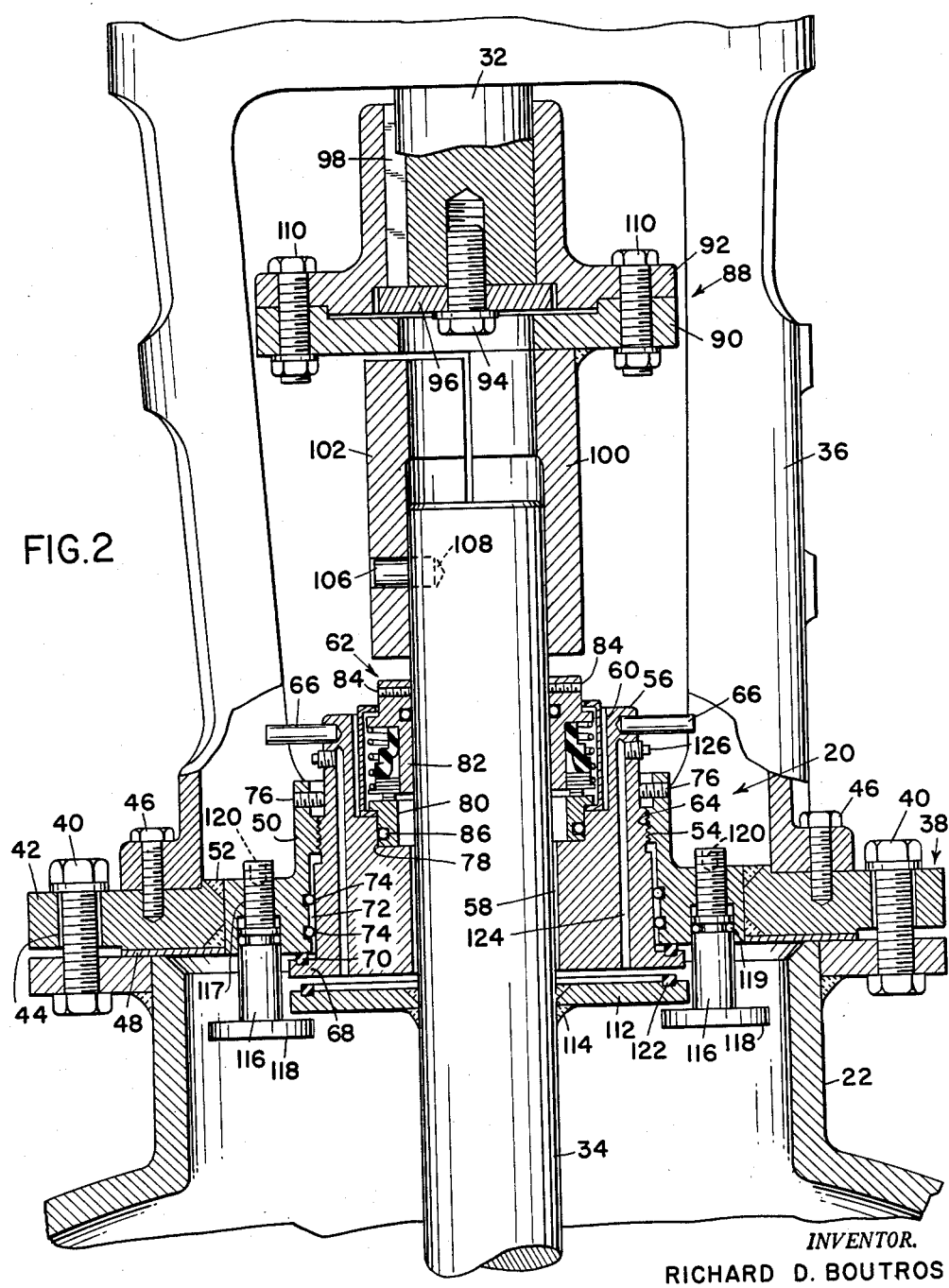
FIG. 2 is an enlarged sectional elevation of the shaft sealing construction shown in FIG. 1.

Referring to FIG. 2, closure member 38 has an outer annular portion 42 which is formed with a series of spaced holes 44 through which bolts 40 pass for securing the same to nozzle 22. Portion 42 is also formed with an inner series of tapped holes which are designed to receive bolts 46 which secure the lower end of frame member 36 to closure member 38. Portion 42 has a sheet of corrosion resistant metal 48 or other suitable material fastened to the inner surface thereof for protecting it from the corrosive action of the contents of the receptacle.

An intermediate portion 50 is attached to outer portion 42 by means of welding 52. Intermediate portion 50 is also annular, but it has greater transverse depth than outer portion 42 and is formed with threads 54 adjacent the outboard end thereof for threadedly engaging an inner portion 56 which in turn is annular and of even greater transverse depth than intermediate portion 50. Inner portion 56 is formed with an opening or bore 58 which is only slightly larger in diameter than the diameter of shaft element 34. Inner portion 56 is formed adjacent its outer end with a counter-bore 60 which forms a seat for a unitary seal, preferably a mechanical seal, such as that shown generally at 62. It will be seen that the intermediate, outer, and inner portions of closure member 38 cooperate to reduce the diameter of the opening through which shaft element 34 extends from the diameter of nozzle 22 to a diameter only slightly greater than shaft 34. While outer and intermediate portions 42 and 50, respectively, are separately formed and then combined, as above, it will be readily understood that they may be initially formed as a unitary member.

Inner member 56 is formed with a series of threads 64 which are adapted to engage threads 54 on intermediate portion 50. Portion 56 is provided with a plurality of radially extending handles 66 by means of which it may be rotated relative to the intermediate and outer portions of the closure member. It will be readily understood that as inner portion 56 is rotated, the interaction of threads 54 and 64 causes the intermediate portion to move axially inwardly or outwardly along shaft element 34. This axial movement of inner portion 56 is utilized to hold shaft element 34 in situ against axial movement when the mechanical seal is being repaired or replaced, as hereinafter more fully described.

Inner portion 56 is formed with a radially extending flange 68 adjacent the inboard end thereof. Flange 68 overlies a part of intermediate portion 50 and is provided with an annular sealing element or gasket 70 which seals an annular passageway 72 between the inner and intermediate portions. Seal 70 prevents the contents of the receptacle, which may often be corrosive, from extending between portions 50 and 56 and attacking threads 54 and 64. The sealing action of element 70 is reinforced by means of two annular O-rings 74 which are mounted in suitable notches or grooves formed in the inner surface of intermediate portion 50. Intermediate portion 50 is formed with a pair of set screws 76, outboard of threads 54 which may be tightened to lock inner portion 56 in desired position relative to intermediate portion 50.

As stated earlier, inner portion 56 has a bore 60 formed therein for the reception of mechanical seal assembly 62. Bore 60 in turn is formed with a counterbore 78 adjacent the inner end thereof which is of the proper diameter for receiving the stationary ring or member 80 of mechanical seal assembly 62. Seal 62 also comprises a rotatable ring or member 82 which is mounted on shaft element 34 and is caused to rotate therewith in contact with the sealing surface of stationary member 80. Rotatable ring 82 and its associated parts are held in the proper axial position on shaft element 34 by means of a pair of set screws 84. As a result, shaft element 34, rotatable ring 82, and its associated parts are caused to rotate therewith. Stationary ring 80 is formed with a circumferentially extending notch or recess for receiving an O-ring 86 which forms a seal between ring 80 and inner member 56, thereby preventing the contents of the receptacle from leaking out therebetween. Thus, it will be seen that when shaft element 34 is rotated, it freely passes through inner portion 56, but is sealed thereto by means of mechanical seal 62. Since mechanical seal assembly 62 is of known construction and preferably similar to that shown in the above patent, further description of the various parts thereof is not believed necessary.

Shaft element 34 is connected to output shaft 32 by means of a flanged coupling shown generally at 88 which comprises a flange member 90 attached to shaft element 34 and a flange member 92 attached to output shaft 32. Output flange 92 is held on shaft 32 by means of an axially extending bolt 94 which seats against an annular plate or washer 96 recessed into the lower end of flange 92 as shown in FIG. 2. Flange 92 is rotatively fixed to output shaft 32 by means of a suitable key 98.

Flange 90 on shaft element 34 is preferably demountable, and to this end, comprises a main or body portion 100 and a semi-cylindrical or sleeve portion 102. Flange portions 100 and 102 are held together by means of suitable bolts 104 (FIG. 1) and are rotatively fixed to shaft element 34 by means of a radially extending cylindrical key 106 (FIG. 2) which extends through an opening in flange member 102 into an opening 108 in shaft element 34. Flange members 90 and 92 are secured together by suitable bolts 110 and, as a result, the rotation of output shaft 32 is transmitted to shaft element 34 and causes similar rotation of the agitators or impellers (not shown) which are mounted on shaft element 34 within the mixing receptacle.

However, although sealing rings 80 and 82 afford a substantially leak-proof seal capable of years of efficient service, where one of these rings is made, as is commonly the practice, of a frangible material such as carbon, and such material begins to disintegrate, its disintegration is apt to be extremely rapid with little if any warning, unlike the action of a stuffing box and a packed seal. Consequently, it has not been feasible to use mechanical seals in certain instances where the contents of the receptacle are particularly hazardous or valuable in that, when one of the sealing rings is fractured, there is a rapid loss of contents through the damaged seal.

It is to overcome this difficulty that my present invention is particularly well adapted and to this end, I not only provide means whereby the damaged mechanical seal may be removed and replaced with a new mechanical seal, but I also provide novel auxiliary sealing means which may be brought into engagement to temporarily seal the shaft opening during the replacement of the mechanical seal as hereafter more fully described.

Figure 3:
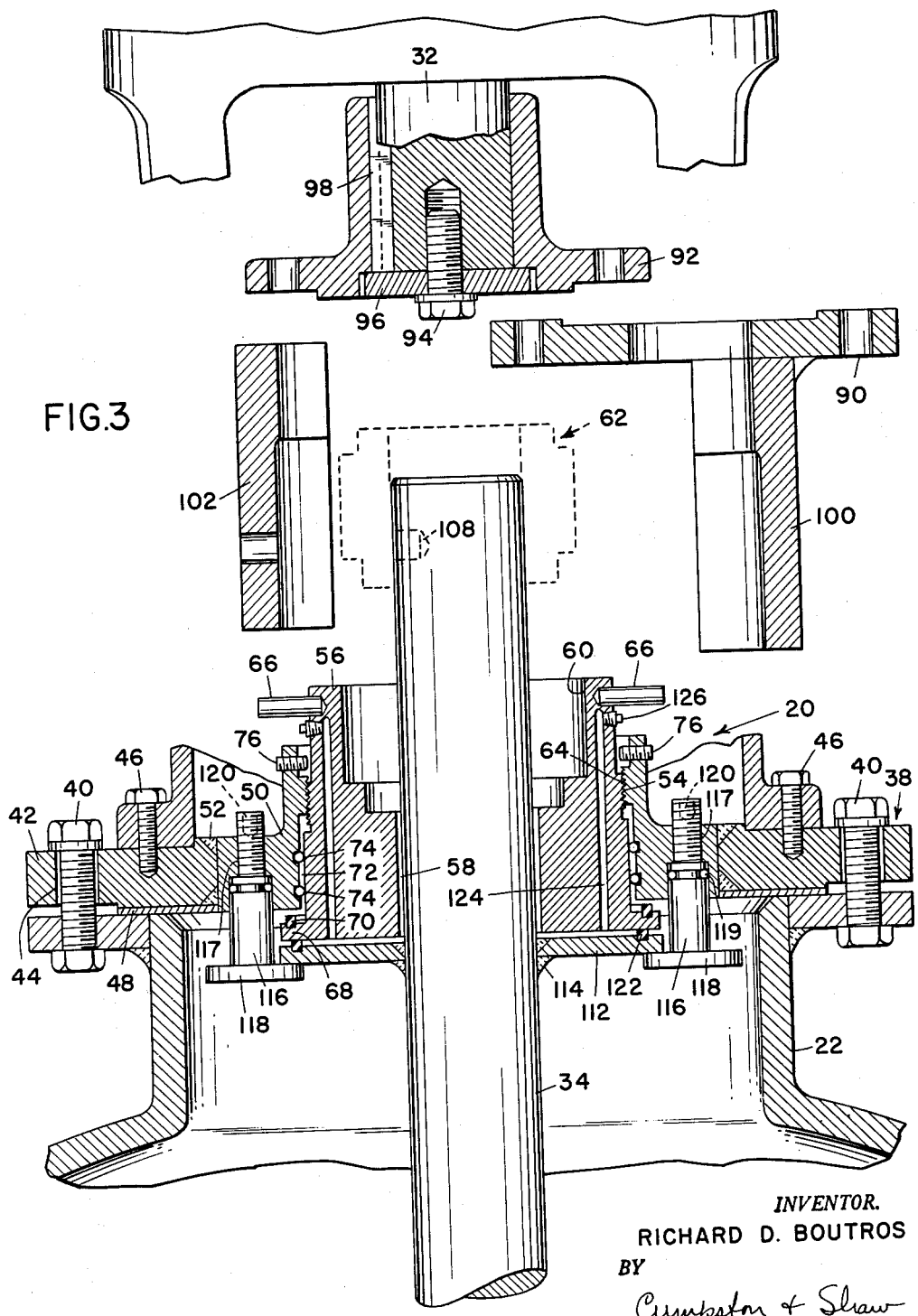
FIG. 3 is similar to FIG. 2, but shows the mechanical seal moved out of position and the auxiliary sealing members in sealing position.

In order to allow the mechanical seal to be removed and repaired or replaced, it is necessary to hold shaft element 34 in situ against axial movement, so that demountable flange 90 may be removed and the mechanical seal unit slipped over the outboard end of shaft element 34 as shown in FIG. 3. In the normal top entering portion of the mixer shown in the drawings, shaft element 34 would tend to move downwardly or inboard when flanges 90 and 92 were separated. On the other hand, however, if the contents of the receptacle were under high pressure, they would exert such a force on the lower end of the agitator shaft that they would lift the shaft outwardly when flange members 90 and 92 were separated. Of course, if the pressure within the receptacle were near the critical pressure required to float or lift shaft element 34, it is possible that as the pressure fluctuated, the shaft would tend to move in opposite directions. To eliminate this axial movement of the shaft and to provide means whereby the mechanical seal may be replaced, I provide means which are operable to engage shaft element 34 and hold the same in situ or in its normal position of rotation against axial movement in either direction. With the shaft so held, the demountable flange 90 may then be removed and the mechanical seal slid up over the outer end of the shaft, as shown in FIG. 3.

The means for holding shaft 34 against axial movement comprises a projecting part or collar 112 which is attached to the shaft by welding 114, inner closure member 56, and a series of bolts 116 which are threadedly mounted on intermediate member 50 as at 117. Bolts 116 are formed at the inboard ends thereof with enlarged circular head portions 118 which underlie shaft collar 112, as shown in FIGS. 2 and 3. Each of bolts 116 is preferably provided with an O-ring 119 inboard of threads 117 for protecting the same from the corrosive action of the contents of the receptacle. The upper ends of bolts 116 are formed with recessed openings 120 for the reception of an Allen wrench or the like whereby the bolts may be raised from their positions out of engagement with shaft collar 112, as shown in FIG. 2, to their second positions in engagement with shaft collar 112 shown in FIG. 3. It will be readily understood that when bolts 116 are in their positions shown in FIG. 3, they will securely hold collar 112 and associated shaft 34 from moving inwardly into the receptacle (downwardly as in FIG. 3).

When the mixer is oriented as a top entering device and the contents of the mixer are not under sufficient pressure to raise the shaft element, the above would be sufficient for holding the shaft element during the replacement of the mechanical seal. However, in order to allow the shaft seal to be used on the side or bottom of the receptacle or in any position when the pressure within the receptacle is sufficient to raise the agitator shaft, I provide further holding means which engages shaft collar 112 on the outboard side thereof opposite bolts 116.

This second holding action is achieved by threading inner closure member 56 inwardly from its normal position shown in FIG. 2 to its lowered position shown in FIG. 3, into contact with shaft collar 112 where it will securely hold collar 112 and shaft 34 from moving axially outwardly. Thus, it will be seen from an inspection of FIG. 3 that my construction provides positive means for holding shaft 34 and collar 112 against axial movement inwardly or outwardly. When shaft 34 is held in its position shown in FIG. 3, flange 90 may be readily disassembled and removed without interfering with flange 92 on output shaft 32. Thereafter, set screws 84 on seal unit 62 may be loosened and the entire mechanical seal slid outwardly over the outboard free end of shaft 34 for repairs or replacement. A new seal may then be moved into position and the above steps reversed to place the shaft and associated mixer in operable condition.

As mentioned earlier, I also provide auxiliary sealing means which will temporarily seal the opening through the closure member so that the mechanical seal can be repaired or replaced without excessive loss of contents. When the mixer is oriented as a top entering mixer and the contents of the receptacle are under pressure, or when the mixer is a side or bottom entering unit, it will be readily appreciated that without such auxiliary sealing means there would be excessive loss of contents which, if toxic, would be extremely dangerous. Of course, if the contents are valuable, an excessive loss would be an expensive procedure.

My auxiliary sealing means comprises an annular sealing member or element 122 which is mounted in a groove or recess on the outboard surface of shaft collar 112, as shown in FIG. 3. Sealing member 122 is so positioned that it is engaged by the inner end of inner closure member 56 as the same is moved axially inwardly into engagement with shaft collar 112. When the parts are in their positions shown in FIG. 3, it will be readily seen that sealing member 122 seals the bottom of inner closure member 56 and prevents contents from moving through the bore thereof into the area normally holding the mechanical seal. (At the same time O-rings 74 continue their sealing action between inner and intermediate members 56 and 50 inboard of threads 54 and 64.) In order to determine whether any contents are leaking around auxiliary member 122, I preferably provide one or more telltales which are merely passageways 124 extending through inner member 56 and terminating substantially midway between the inner bore of inner member 56 and the outer edge thereof. By removing plugs 126 the operator is readily able to determine whether the contents are leaking past sealing member 122.

Since my device provides positive holding means which engage shaft collar 112 on opposite sides thereof, shaft element 34 is held securely against axial movement in any orientation of the mixer. That is, the mixer and my above seal may be used on the top of the receptacle, on the side thereof or on the bottom, and in all instances my device will operate as described.

Figure 4:
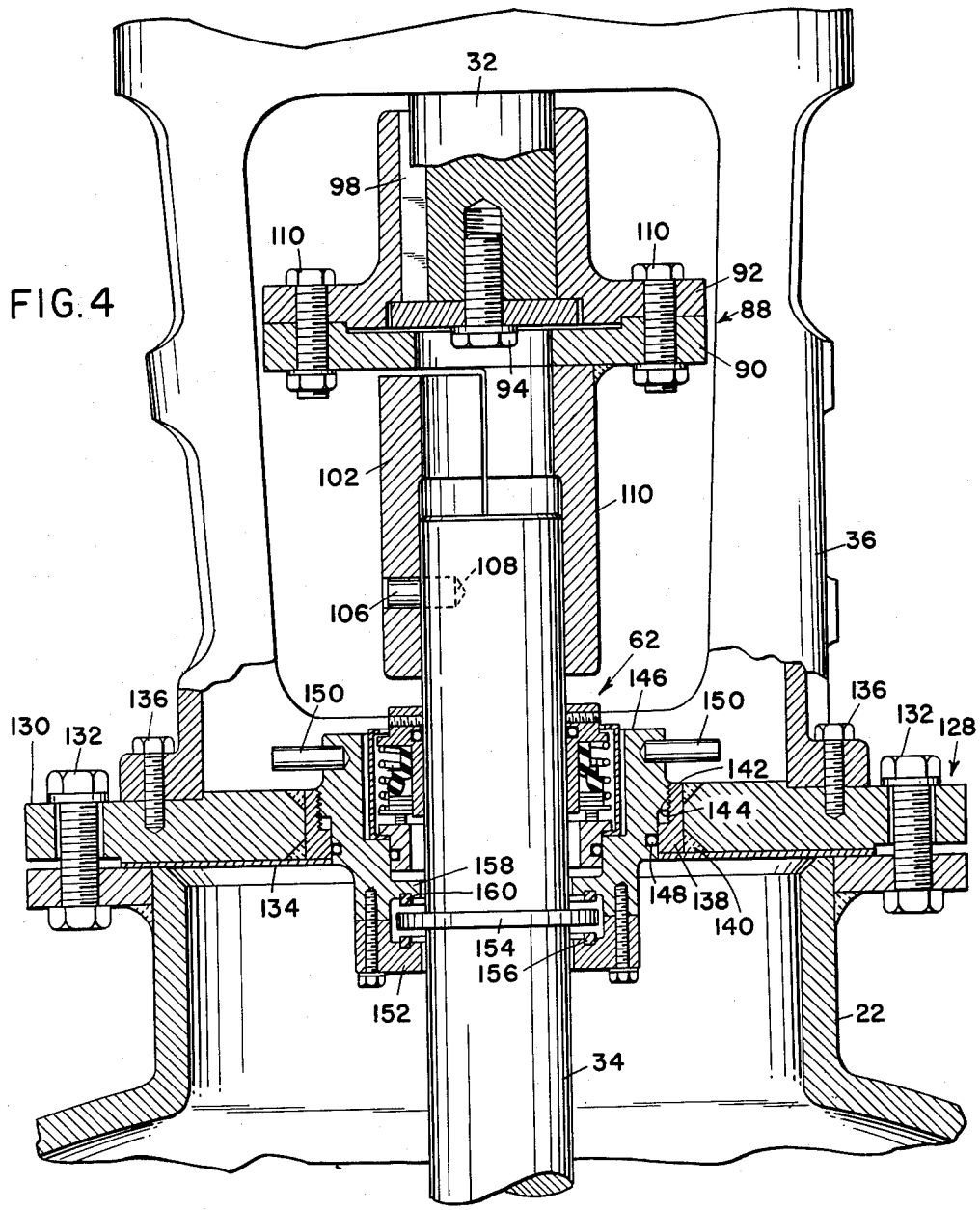
FIG. 4 is a sectional side elevation of a slightly modified construction shown as applied to the top of a mixing receptacle.
Figure 5:
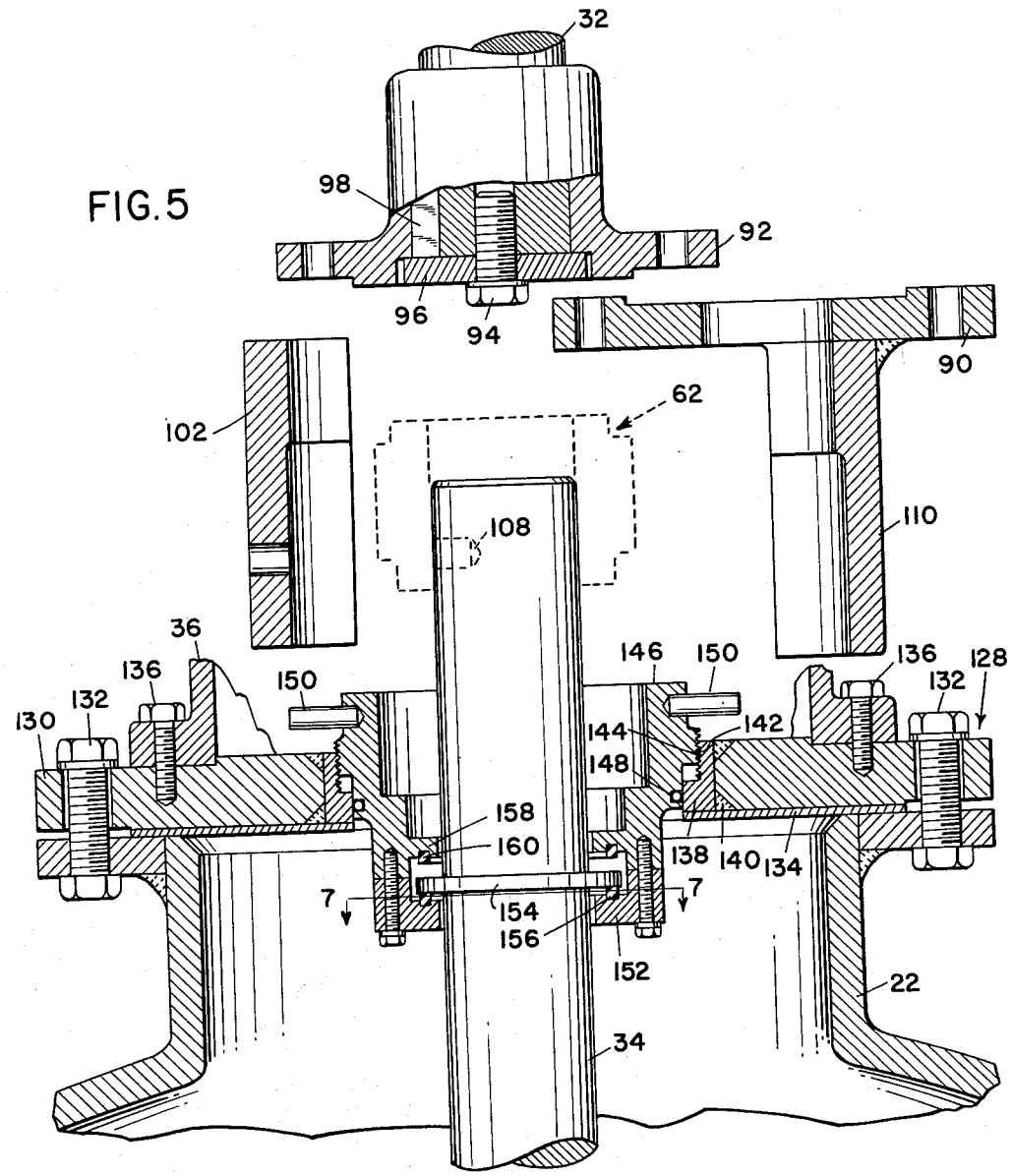
FIG. 5 is similar to FIG. 4, but it shows the mechanical seal moved out of sealing position and the auxiliary sealing members in sealing position.
Figure 6:
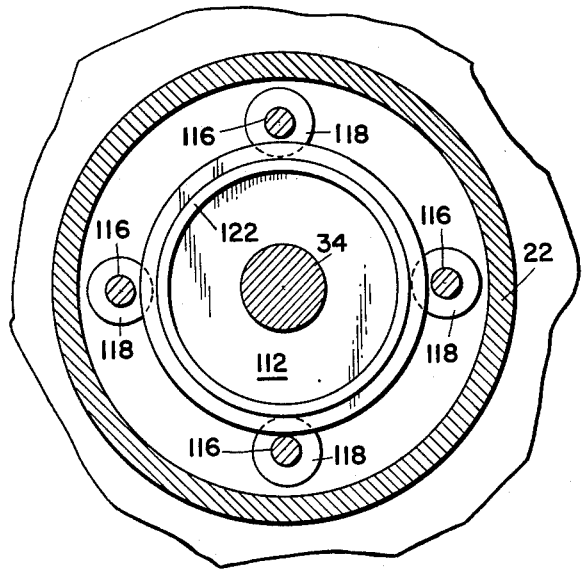
FIG. 6 is a sectional plan view substantially along the line 6—6 in FIG. 1.
Figure 8:
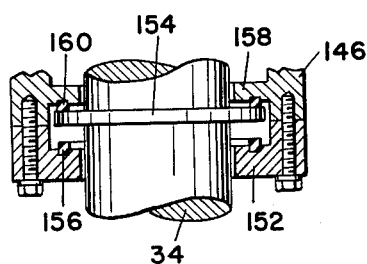
FIG. 8 is a fragmentary elevational view of the auxiliary sealing means and shaft holding means of FIG. 5, but shown in an alternative position.
Figure 7:
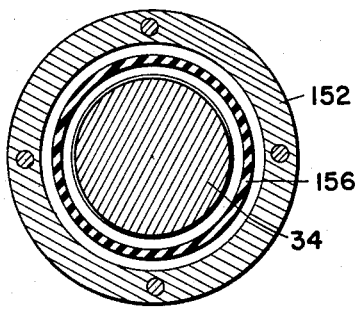
FIG. 7 is a sectional plan view substantially along the line 7—7 in FIG. 5.

In FIGS. 4, 5, and 8, I have shown a slightly modified shaft seal construction in which shaft element 34 may be held against movement in one direction, but can not be simultaneously held against movement in opposite directions. In FIG. 4 the shaft seal comprises a closure member or flange shown generally at 128 which is similar to closure member 38 described earlier and comprises outer, intermediate, and inner portions. Closure member outer portion 130 is secured to the nozzle 22 of the receptacle by means of suitable bolts 132 and has a sheet of corrosion resistant metal 134, or other suitable material fastened to the inner surface thereof to protect it from the corrosive action of the contents. The lower portion of mixer frame 36 is fastened to closure member 130 by means of suitable bolts 136. An intermediate closure member 138 is fastened to portion 130 as by welding 140 and has threads 142 formed therein for threaded engagement with threads 144 on an inner portion 146. Threads 142 and 144 allow inner portion 146 to be moved axially inwardly or outwardly along shaft element 34. The mechanical seal unit shown generally at 62 is mounted in inner portion 146 in the same manner as described earlier in regard to the embodiment shown in FIGS. 1-3. Inner member 146 has a circumferentially extending notch or recess which holds an O-ring 148 of synthetic rubber or other suitable material which seals inner member 146 to intermediate member 138 and protects threads 142 and 144 from the corrosive action of the contents of the receptacle.

In FIG. 4 I have shown this construction in its normal position with the opening through the closure member being sealed by mechanical seal unit 62 and shaft element 34 in condition for rotation. When it is desired to repair or replace the mechanical seal, the mixer is stopped and the inner closure member rotated as by means of handles 150 to move inner portion 146 axially inwardly or outwardly along shaft element 34. If the contents of the receptacle are under a vacuum or under a low pressure and the unit is mounted as a top entering device as shown in FIG. 5, it will be sufficient to hold shaft element 34 from axial movement inwardly into the receptacle. To this end, inner closure member 146 is threaded outwardly to bring a cap portion 152 thereof into engagement against the undersurface of a shaft collar 154 which is similar to collar 112. Although collars 112 and 154 may be integrally formed with shaft element 34, I prefer to make them separately and mount them on the shaft by welding or other suitable means. In any event each of collars 112 and 154 becomes a fixed part of shaft element 34 and moves and rotates in unison therewith. It will be seen that when inner closure member 146 is moved into its position shown in FIG. 5, shaft element 34 is held against axial movement into the receptacle and demountable flange 90 may be readily removed and mechanical seal 62 replaced. When it is desired to provide an auxiliary seal to temporarily seal the opening through closure member 128, I preferably add a circumferentially extending sealing member or ring 156 which is positioned on cap 152 so as to be brought into engagement with the undersurface of shaft collar 154, as shown in FIG. 5.

If the contents of the receptacle were under sufficient pressure to move the shaft outwardly, or if the mixer were positioned as a side or bottom entering unit, then inner closure member 146 would be rotated in a direction opposite that described above to cause the same to move axially inwardly along shaft element 34 to bring an inner cap 158 thereof into engagement with shaft collar 154. This position of the parts is shown in FIG. 8, and since under these conditions there would apt to be serious leakage of the contents, I preferably provide an auxiliary seal. The auxiliary sealing means preferably comprises an annular ring or sealing member 160 which is seated in a recess or notch in inner cap 158 in such a position that when the inner portion 146 is threaded inwardly, sealing member 160 will be brought into sealing engagement with the upper or outboard surface of collar 154, as shown in FIG. 8. With the shaft opening thus sealed by the auxiliary sealing member 160 and with shaft element 34 being held against the sealing member, either by means of the pressure within the receptacle if a top or side entering, or by the action of gravity if bottom entering, it will be readily seen that flanged coupling 88 between shaft element 34 and output shaft 32 may be separated and the mechanical seal removed in the same manner as described earlier.

Thus, it will be seen that with the modified construction shown in FIGS. 4 through 8, the leakage through the closure member resulting from the failure of mechanical seal unit 62 may be quickly checked by stopping the agitator and moving inner closure member axially inwardly or outwardly as the case may be to support shaft element 34 and prevent axial movement thereof from its normal position of rotation. Since end cap members 152 and 158 preferably have auxiliary sealing members attached thereto, this axial movement of the inner closure member also serves to actuate the auxiliary sealing means and to prevent further leakage of the contents of the receptacle.

While the construction shown in FIGS. 4, 5, 7 and 8 is well adapted for use as a top entering or bottom entering mixer, it is not as well suited for a side entering mixer because shaft element 34 is supported on only one side and if the shaft is long, it would have a tendency to tip slightly as it passes through end caps 152 and 158 and inner member 146. However, my preferred construction in FIGS. 1–3 may be readily used in any orientation of the mixer, for this construction provides positive means for engaging the opposite sides of shaft collar 112. This opposite engagement securely holds the shaft against axial movement in either direction as well as against tipping. In addition, the construction shown in FIGS. 1–3 provides an efficient and practical auxiliary seal construction which will effectively and readily seal the opening through the closure member for allowing the mechanical seal to be removed and replaced.

Thus it will be seen that my invention provides a novel shaft seal which is particularly well adapted for sealing the opening around a rotatable shaft. My seal construction utilizes the high efficiency of the mechanical seal while at the same time it provides safety features whereby a mechanical seal may be safely used with dangerous or expensive fluids. As a result of my invention, it is no longer necessary to drain or pump out a receptacle when a mechanical seal fails, but rather the opening around the shaft may be quickly and positively resealed by merely stopping the mixing apparatus and moving the inner portion of the closure member inwardly or outwardly as the case may be to bring the auxiliary sealing members located within the receptacle into sealing engagement.

In addition, my invention provides means whereby the damaged mechanical seal may be safely removed and replaced while the shaft opening is sealed by the above auxiliary seal members. Thereafter, the operative rotation of the shaft may be resumed by merely moving the inner portion of the closure member back to its normal operative position thereby releasing the shaft holding means and de-activating the auxiliary seal.

It will be understood that although the shaft element shown in the drawings comprises a single length of shaft, my invention is by no means so limited, for the shaft element may readily comprise one or more lengths of shafting properly connected together. This is particularly true when the mixer is used as a top entering mixer, for when the headroom above the receptacle is limited it may be desirable to construct agitator shaft 34 of several segments or sections which are properly coupled together when in position within the receptacle.

In addition, while I have shown auxiliary seal means for sealing the receptacle opening during the repair or replacement of the mechanical seal assembly, my invention is not so limited. When the mechanical seal is above the level of the liquid in the receptacle, as, for example, when positioned as a top entering mixer, and the vessel either is not under pressure during the mixing operation, or the pressure may be safely released, it is not necessary to provide an auxiliary seal. However, since the inner end of shaft element 34 is unsupported axially, it is necessary to provide means for holding shaft element 34 in its normal position when the driving means and shaft element are separated for the removal of the mechanical seal. Under these circumstances with the construction shown in FIGS. 1–3 it would not be necessary to thread inner closure member 56 inwardly from its position shown in FIG. 2, but it would be sufficient to support shaft collar 112 by merely bringing holding bolts 116 up into engagement therewith. In the construction shown in FIGS. 4–8, this same result would be achieved by threading inner closure member 146 axially outwardly to its position shown in FIG. 5. Whether or not sealing member 156 is provided in the construction shown in FIG. 5, I prefer to hold shaft element 34 in position by the means described above.

Although O-rings 74, 86 and 148, and sealing members 70, 122, 156 and 160 are preferably of neoprene, Teflon, natural or synthetic rubber, it will be readily appreciated that they may be made of any known material which is best suited to resist the corrosive action of the particular contents of the receptacle.

It will thus be seen that the invention accomplishes its objects and while it has been disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. In a shaft construction for use with a fluid containing receptacle having an opening therein, said construction comprising a rotatable shaft element extending through said opening; driving means; means for separably connecting said driving means to said shaft element; a closure member attachable to the receptacle adjacent the opening therein and having an opening therethrough for the reception of said shaft element; and mechanical sealing means associated with said shaft means and said closure member for sealing said opening in said closure member, the improvement comprising: formation of said shaft element to define a discontinuity therein having a non-axial surface and positioned inboard of said mechanical sealing means; means associated with said closure member and cooperable with said discontinuity for holding said shaft element in situ against axial movement; said driving means being separable from said shaft element at said connecting means for allowing removal and replacement of said sealing means, said holding means being movable from a first position out of engagement with said shaft element to a second position in engagement with said non-axial surface of said discontinuity of said shaft element for holding said shaft element in situ against axial movement when said driving means and said shaft element are separated for removal of said mechanical sealing means.

2. A sealed shaft construction for use with a fluid containing receptacle having an opening therein, said construction comprising a rotatable shaft element extending through said opening; driving means; means for separably connecting said driving means to said shaft element; a closure member attachable to the receptacle adjacent to the opening therein and having an opening therethrough for the reception of said shaft element; a first sealing means comprising a mechanical seal associated with said shaft means and said closure member for sealing said opening in said closure member; means associated with said closure member for holding said shaft element in situ against axial movement; said driving means being separable from said shaft element at said connecting means for allowing removal and replacement of said first sealing means, said holding means being movable from a first position out of engagement with said shaft element to a second position in engagement with said shaft element for holding said shaft element in situ against axial movement when said driving means and said shaft element are separated for removal of said first sealing means; auxiliary sealing members inboard of said first sealing means, one of said auxiliary sealing members being associated with said closure member, the other of said auxiliary sealing members being associated with said shaft element, said one of said auxiliary sealing members being movable from a first position out of engagement with the other of said auxiliary sealing members to a second position in engagement with said other auxiliary sealing member for temporarily sealing said opening in said closure member during which time said first sealing means may be removed.

3. In a sealed shaft construction for use with a fluid containing receptacle having an opening therein, said construction comprising a rotatable shaft element extending through said opening; driving means; a closure member attachable to the receptacle adjacent the opening therein and having an opening therethrough for the reception of said shaft element; means outboard of said closure member for separably connecting said shaft element and said driving means; and mechanical sealing means associated with said shaft means and said closure member for sealing said opening in said closure member, the improvement comprising: a normally open auxiliary sealing means inboard of said mechanical sealing means and closable for temporarily sealing said opening in said closure member for a time during which said mechanical sealing means can be removed; formation of said shaft to define a discontinuity therein having a non-axial surface and positioned inboard of said mechanical sealing means; means associated with said closure member and cooperable with said discontinuity for holding said shaft element in situ against axial movement; said driving means being separable from said shaft element at said connecting means for allowing removal and replacement of said mechanical sealing means, said holding means being movable from a first position out of engagement with said shaft element to a second position in engagement with said non-axial surface of said discontinuity of said shaft element for holding said shaft element in situ against axial movement when said driving means and said shaft element are separated for removal of said mechanical sealing means; and means movable with said holding means for closing said auxiliary sealing means.

4. In a shaft construction for use with a fluid containing receptacle having an opening therein, said construction comprising a rotatable shaft element extending through said opening; driving means; means for separably connecting said driving means to said shaft element; a closure member attachable to the receptable adjacent the opening therein and having an opening therethrough for the reception of said shaft element; and unitary mechanical sealing means associated with said shaft means and said closure member for sealing said opening in said closure member, the improvement comprising: providing said shaft element with a substantially radially extending collar inboard of said sealing means; means associated with said closure member and cooperable with said collar for holding said shaft element in situ against axial movement; said driving means being separable from said shaft element at said connecting means for allowing removal and replacement of said unitary mechanical sealing means, said holding means being movable axially from a first position out of engagement with said shaft element to a second position in engagement with a substantially radially extending surface of said collar for holding said shaft element in situ against axial movement when said driving means and said shaft element are separated.

5. In a shaft construction for use with a fluid containing receptacle having an opening therein, said construction comprising a rotatable shaft element extending through said opening and having a projecting portion; driving means; means outboard of said projecting portion for separably connecting said driving means to said shaft element; a closure member attachable to the receptacle adjacent the opening therein and having an opening therethrough for the reception of said shaft element; and unitary mechanical sealing means associated with said shaft means and said closure member for sealing said opening in said closure member; the improvement comprising; normally open auxiliary sealing means inboard of said mechanical sealing means and closable for temporarily sealing said opening in said closure member for a time during which said mechanical sealing means can be removed; means associated with said closure member for holding said shaft element in situ against axial movement; said driving means being separable from said shaft element at said connecting means for allowing removal and replacement of said unitary mechanical sealing means, said holding means being movable axially outwardly from a first position out of engagement with said shaft element to a second position in engagement with said projecting portion of said shaft element for holding said shaft element in situ against axial movement inwardly when said driving means and said shaft element are separated, said engagement of said holding means and said projecting portion of said shaft element effectively closing said auxiliary sealing means.

6. In a shaft construction for use with a fluid containing receptacle having an opening therein, said construction comprising a rotatable shaft element extending through said opening and having a projecting portion; driving means; means outboard of said projecting portion for separably connecting said driving means to said shaft element; a closure member attachable to the receptable adjacent the opening therein and having an opening therethrough for the reception of said shaft element; and unitary mechanical sealing means associated with said shaft means and said closure member for sealing said opening in said closure member, the improvement comprising: means associated with said closure member for holding said shaft element in situ against axial movement; said driving means being separable from said shaft element at said connecting means for allowing removal and replacement of said unitary mechanical sealing means, said holding means being movable from a first position out of engagement with said shaft element to a second position in engagement with said projecting portion of said shaft element, said holding means in said second position thereof engaging said projecting portion of said shaft element on opposite sides thereof for holding said shaft element in situ against axial movement in either direction when said driving means and said shaft element are separated.

7. A sealed shaft construction for use with a fluid containing receptacle having an opening therein, said construction comprising a rotatable shaft element extending through said opening and having a projecting portion adjacent the outboard end thereof; driving means; means for separably connecting said driving means to said shaft element; a closure member attachable to the receptacle adjacent the opening therein and having an opening therethrough for the reception of said shaft element; unitary mechanical sealing means associated with said shaft means and said closure member for sealing said opening in said closure member; means associated with said closure member for holding said shaft element in situ against axial movement; said driving means being separable from said shaft element at said connecting means for allowing removal and replacement of said unitary mechanical sealing means, said holding means being movable axially from a first positon out of engagement with said shaft element to a second position in engagement with said projecting portion of said shaft element, said holding means in said second position thereof engaging opposite sides of said projecting portion of said shaft element for holding said shaft element in situ against axial movement in either direction when said driving means and said shaft element are separated, said engagement of said holding means with said projecting portion of said shaft element effectively sealing said opening in said closure member temporarily for a time during which said mechanical sealing means can be removed.

8. A sealed shaft construction for use with a fluid containing receptacle having an opening therein, said construction comprising a rotatable shaft element extending through said opening and having a projecting portion adjacent the outboard end thereof; driving means; means for separably connecting said driving means to said shaft element; a closure member attachable to the receptacle adjacent the opening therein and having an opening therethrough for the reception of said shaft element; a first sealing means comprising a unitary mechanical seal associated with said shaft means and said closure member for sealing said opening in said closure member; means associated with said closure member for holding said shaft element in situ against axial movement; said driving means being separable from said shaft element at said connecting means for allowing removal and replacement of said first sealing means, said holding means being movable axially outwardly from a first position out of engagement with said shaft element to a second position in engagement with a projecting portion of said shaft element for holding said shaft element in situ against axial movement when said driving means and said shaft element are separated; auxiliary sealing members inboard of said first sealing means, one of said auxiliary sealing members being associated with said closure member, the other of said auxiliary sealing members being associated with said shaft element, said one of said auxiliary sealing members being movable from a first position out of engagement with the other of said auxiliary sealing members to a second positon in engagement with said other auxiliary sealing member for temporarily sealing said opening in said closure member during which time said first sealing means may be removed.

9. A sealed shaft construction for use with a fluid containing receptacle having an opening therein, said construction comprising a rotatable shaft element extending through said opening and having a projecting portion adjacent the outboard end thereof; driving means; means for separably connecting said driving means to said shaft element; a closure member attachable to the receptacle adjacent the opening therein and having an opening therethrough for the reception of said shaft element; a first sealing means comprising a unitary mechanical seal associated with said shaft means and said closure member for sealing said opening in said closure member; means associated with said closure member for holding said shaft element in situ against axial movement; said driving means being separable from said shaft element at said connecting means for allowing removal and replacement of said first sealing means; said holding means being movable from a first position out of engagement with said shaft element to a second position in engagement with said projecting portion of said shaft element, said holding means in said second position thereof engaging said projecting portion of said shaft element on opposite sides thereof for holding said shaft element in situ against axial movement in either direction when said driving means and said shaft element are separated; auxiliary sealing members inboard of said first sealing means, one of said auxiliary sealing members being associated with said closure member, the other of said auxiliary sealing members being associated with said shaft element, said one of said auxiliary sealing members being movable from a first position out of engagement with the other of said auxiliary sealing members to a second position in engagement with said other auxiliary sealing member for temporarily sealing said opening in said closure member during which time said first sealing means may be removed.

10. A sealed shaft construction for use with a fluid containing receptacle having an opening therein, said construction comprising a rotatable shaft element extending through said opening and having a projecting portion adjacent the outboard end thereof; driving means; means for separably connecting said driving means to said shaft element; a closure member attachable to a receptacle adjacent the opening therein and having an opening therethrough for the reception of said shaft element; a first sealing means comprising a unitary mechanical seal associated with said shaft means and said closure member for sealing said opening in said closure member; means associated with said closure member for holding said shaft element in situ against axial movement; said driving means being separable from said shaft element at said connecting means for allowing removal and replacement of said first sealing means, said holding means being movable axially from a first position out of engagement with said shaft element to a second position in engagement with said projecting portion of said shaft element, said holding means in said second position thereof engaging opposite sides of said projecting portion of said shaft element for holding said shaft element in situ against axial movement when said driving means and said shaft element are separated; auxiliary sealing members inboard of said first sealing means, one of said auxiliary sealing members being associated with said closure member, the other of said auxiliary sealing members being associated with said shaft element, said one of said auxiliary sealing members being movable from a first position out of engagement with the other of said auxiliary sealing members to a second position in engagement with said other auxiliary sealing member for temporarily sealing said opening in said closure member during which time said first sealing means may be removed.

11. A sealed shaft construction for use with a fluid containing receptacle having an opening therein, said construction comprising a rotatable shaft element extending through said opening; driving means; a closure member attachable to the receptacle adjacent the opening therein and having an opening therethrough for the reception of said shaft element; unitary mechanical sealing means associated with said shaft element and said closure member for sealing said opening in said closure member; normally open auxiliary sealing means inboard of said mechanical sealing means and closable for temporarily sealing said opening in said closure member; flange means on said shaft element and said driving means outboard of said sealing means; means for securing said flange means together for joining said shaft element and said driving means; means associated with said closure member for holding said shaft element in situ against axial movement; said means connecting said flange means being releasable for separating said driving means and said shaft element, said flange means on said shaft element being removable for allowing removal and replacement of said unitary mechanical sealing means, said holding means being movable from a first position out of engagement with said shaft element to a second position in engagement with said shaft element for holding said shaft element in situ against axial movement when said driving means and said shaft elements are separated, said holding means in said second position effectively closing said auxiliary sealing means.

12. A sealed shaft construction for use with a fluid containing receptacle having an opening therein, said construction comprising a rotatable shaft element extending through said opening and having a radially projecting collar inboard of said opening; driving means; a closure member attachable to the receptacle adjacent the opening therein and having an opening therethrough for the reception of said shaft element; unitary mechanical sealing means associated with said shaft element and said closure member for sealing said opening in said closure member; normally open auxiliary sealing means inboard of said mechanical sealing means and closable for temporarily sealing said opening in said closure member for a time during which said mechanical sealing means can be removed; flange means on said shaft element and said driving means outboard of said sealing means; means for securing said flange means together for joining said shaft element and said driving means; means associated with said closure member for holding said shaft element against axial movement; said means connecting said flange means being releasable for separating said driving means and said shaft element, said flange means on said shaft element being removable for allowing removal and replacement of said sealing means, said holding means being movable axially from a first position out of engagement with said shaft element to a second position in engagement with said collar for holding said shaft element in situ against axial movement when said driving means and said shaft elements are separated, engagement of said holding means with said collar effectively closing said auxiliary sealing means.

13. A sealed shaft construction for use with a fluid containing receptacle having an opening therein, said construction comprising a rotatable shaft element extending through said opening and having a projecting portion adjacent the outboard end thereof; driving means; a closure member attachable to the receptacle adjacent the opening therein and having an opening therethrough for the reception of said shaft element; a first sealing means comprising a unitary mechanical seal associated with said shaft element and said closure member for sealing said opening in said closure member; flange means on said shaft element and said driving means outboard of said first sealing means; means for securing said flange means together for joining said shaft element and said driving means; means associated with said closure member for holding said shaft element in situ against axial movement; said means connecting said flange means being releasable for separating said driving means and said shaft element for allowing removal and replacement of said first sealing means, said holding means being movable axially outwardly from a first position out of engagement with said shaft element to a second position in engagement with said projecting portion of said shaft element for holding said shaft element in situ against axial movement inwardly when said driving means and said shaft element are separated; auxiliary sealing members inboard of said first sealing means, one of said auxiliary sealing members being associated with said closure member, the other of said auxiliary sealing members being associated with said shaft element, said one of said auxiliary members being movable from a first position out of engagement with the other of said auxiliary sealing members to a second position in engagement with said other auxiliary sealing member for temporarily sealing said opening in said closure member during which time said first sealing means may be removed.

14. A sealed shaft construction for use with a fluid containing receptacle having an opening therein, said construction comprising a rotatable shaft element extending through said opening and having a projecting portion adjacent the outboard end thereof; driving means; a closure member attachable to a receptacle adjacent the opening therein and having an opening therethrough for the reception of said shaft element; a first sealing means comprising a unitary mechanical seal associated with said shaft element and said closure member for sealing said opening in said closure member; flange means on said shaft element and said driving means outboard of said first sealing means; means for securing said flange means together for joining said shaft element and said driving means; means associated with said closure member for holding said shaft element in situ against axial movement; said driving means being separable from said shaft element at said connecting means for allowing removal and replacement of said first sealing means, said holding means being movable axially outwardly from a first position out of engagement with said shaft element to a second position in engagement with said projecting portion of said shaft element; auxiliary sealing members inboard of said first sealing means, one of said auxiliary sealing members being associated with said closure member, the other of said auxiliary sealing members being associated with said shaft element, said one of said auxiliary members being movable from a first position out of engagement with the other of said auxiliary sealing members to a second position in engagement with said other auxiliary sealing member for temporarily sealing said opening in said closure member, said holding means in said second position thereof engaging said projecting portion of said shaft element on opposite sides thereof for holding said shaft element in situ against axial movement in either direction when said driving means and said shaft element are separated during which time said first sealing means may be removed.

References Cited in the file of this patent
UNITED STATES PATENTS

| | | |
|---|---|---|
| 2,945,711 | Dykman | July 19, 1960 |
| 3,063,725 | Frey | Nov. 13, 1962 |